United States Patent
Gordon et al.

(10) Patent No.: US 10,259,452 B2
(45) Date of Patent: Apr. 16, 2019

(54) SELF-DRIVING VEHICLE COLLISION MANAGEMENT SYSTEM

(71) Applicant: International Business Machines Corporation, Armonk, NY (US)

(72) Inventors: Michael S. Gordon, Yorktown Heights, NY (US); Stacy F. Hobson, Poughkeepsie, NY (US); James R. Kozloski, New Fairfield, CT (US); Ashish Kundu, Elmsford, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/397,855

(22) Filed: Jan. 4, 2017

(65) Prior Publication Data

US 2018/0186366 A1 Jul. 5, 2018

(51) Int. Cl.
*B60W 30/09* (2012.01)
*B60W 30/085* (2012.01)

(52) U.S. Cl.
CPC .......... *B60W 30/085* (2013.01); *B60W 30/09* (2013.01); *B60W 2530/10* (2013.01); *B60W 2550/10* (2013.01)

(58) Field of Classification Search
None
See application file for complete search history.

(56) References Cited

U.S. PATENT DOCUMENTS

| 4,665,395 A | 5/1987 | Van Ness |
| 4,908,988 A | 3/1990 | Yamamura et al. |
| 5,975,791 A | 11/1999 | McCulloch |
| 6,064,970 A | 5/2000 | McMillian et al. |
| 6,201,318 B1 | 3/2001 | Guillory |

(Continued)

FOREIGN PATENT DOCUMENTS

| CN | 1135063 | 11/1996 |
| CN | 2349068 Y | 11/1999 |

(Continued)

OTHER PUBLICATIONS

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

(Continued)

*Primary Examiner* — Rami Khatib
(74) *Attorney, Agent, or Firm* — Law Office of Jim Boice

(57) ABSTRACT

A method generates and implements a real-time amelioration action for ameliorating an imminent collision between a self-driving vehicle (SDV) and an object. One or more processors detect that an imminent collision by a self-driving vehicle (SDV) is imminent with a confidence C1, and determine whether the SDV has an occupant of occupant type P with a confidence C2. One or more processors identify an object with which the imminent collision by the SDV is imminent with a confidence C3, and then generate and implement, based on C1, C2, C3, and P, a real-time amelioration action for ameliorating the imminent collision between the SDV and the object.

16 Claims, 8 Drawing Sheets

(56) References Cited

U.S. PATENT DOCUMENTS

| | | |
|---|---|---|
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,180,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,810,392 B1 | 8/2014 | Teller et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,923,890 B1 * | 12/2014 | White ............ H04W 4/90 455/456.3 |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,024,787 B2 | 5/2015 | Alshinnawi et al. |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,218,698 B2 | 12/2015 | Ricci |
| 9,286,520 B1 | 3/2016 | Lo et al. |
| 9,317,033 B2 | 4/2016 | Ibanez-guzman et al. |
| 9,381,915 B1 * | 7/2016 | Crombez ............ B60W 30/08 |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,552,735 B2 | 1/2017 | Pilutti et al. |
| 9,566,958 B2 | 2/2017 | Waldmann |
| 9,566,986 B1 | 2/2017 | Gordon et al. |
| 9,628,975 B1 | 4/2017 | Watkins et al. |
| 9,646,496 B1 | 5/2017 | Miller |
| 9,718,468 B2 * | 8/2017 | Barfield, Jr. ......... B60W 30/095 |
| 9,834,224 B2 | 12/2017 | Gordon et al. |
| 10,042,359 B1 | 8/2018 | Konrardy |
| 10,093,322 B2 | 10/2018 | Gordon |
| 2002/0026841 A1 | 3/2002 | Svendsen |
| 2002/0128774 A1 | 9/2002 | Takezaki et al. |
| 2003/0065572 A1 | 4/2003 | McNee et al. |
| 2003/0076981 A1 | 4/2003 | Smith et al. |
| 2004/0078133 A1 | 4/2004 | Miller |
| 2004/0117086 A1 * | 6/2004 | Rao ............. B60R 21/013 701/36 |
| 2004/0199306 A1 | 10/2004 | Helmann et al. |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Kuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0065293 A1 | 3/2008 | Placke et al. |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2008/0288406 A1 | 11/2008 | Seguin et al. |
| 2009/0094109 A1 | 4/2009 | Aaronson et al. |
| 2009/0138168 A1 | 5/2009 | Labuhn et al. |
| 2009/0248231 A1 | 10/2009 | Kamiya |
| 2009/0313096 A1 | 12/2009 | Kama |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0029173 A1 | 2/2011 | Hyde et al. |
| 2011/0035250 A1 | 2/2011 | Finucan |
| 2011/0077807 A1 | 3/2011 | Hyde et al. |
| 2011/0077808 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0123646 A1 | 5/2012 | Mantini |
| 2012/0139756 A1 | 6/2012 | Djurkovic |
| 2012/0277947 A1 | 11/2012 | Boehringer et al. |
| 2012/0293341 A1 | 11/2012 | Lin |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0032049 A1 * | 1/2014 | Moshchuk ......... B62D 15/0265 701/42 |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |

(56) References Cited

U.S. PATENT DOCUMENTS

| | | |
|---|---|---|
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1 | 3/2015 | Fleury |
| 2015/0066282 A1 | 3/2015 | Yopp |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0149018 A1 | 5/2015 | Attard et al. |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0196256 A1 | 7/2015 | Venkatraman et al. |
| 2015/0210280 A1* | 7/2015 | Agnew .............. B60W 30/09 701/48 |
| 2015/0232065 A1 | 8/2015 | Ricci et al. |
| 2015/0235557 A1 | 8/2015 | Engelman |
| 2015/0242953 A1 | 8/2015 | Suiter |
| 2015/0269536 A1 | 9/2015 | Parris |
| 2015/0293994 A1 | 10/2015 | Kelly |
| 2015/0338226 A1 | 11/2015 | Mason et al. |
| 2015/0339639 A1 | 11/2015 | Choe |
| 2016/0001781 A1 | 1/2016 | Fung et al. |
| 2016/0026182 A1 | 1/2016 | Boroditsky et al. |
| 2016/0063761 A1* | 3/2016 | Sisbot .............. B60W 50/14 345/633 |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0202700 A1 | 7/2016 | Sprigg |
| 2016/0205146 A1 | 7/2016 | Sugioka et al. |
| 2016/0221768 A1 | 8/2016 | Kadaba |
| 2016/0303969 A1 | 10/2016 | Akula |
| 2016/0304122 A1* | 10/2016 | Herzog ................. B60D 1/36 |
| 2016/0334797 A1 | 11/2016 | Ross et al. |
| 2016/0344737 A1 | 11/2016 | Anton |
| 2016/0355192 A1 | 12/2016 | James et al. |
| 2016/0358477 A1* | 12/2016 | Ansari ................. G08G 1/167 |
| 2016/0364823 A1 | 12/2016 | Cao |
| 2016/0368534 A1 | 12/2016 | Harda |
| 2016/0371977 A1 | 12/2016 | Wingate |
| 2017/0001650 A1 | 1/2017 | Park |
| 2017/0010613 A1 | 1/2017 | Fukumoto |
| 2017/0021830 A1 | 1/2017 | Feldman et al. |
| 2017/0021837 A1 | 1/2017 | Ebina |
| 2017/0032585 A1 | 2/2017 | Stenneth |
| 2017/0057542 A1 | 3/2017 | Kim et al. |
| 2017/0061798 A1 | 3/2017 | Linder |
| 2017/0088143 A1 | 3/2017 | Goldman-Shenhar et al. |
| 2017/0106876 A1 | 4/2017 | Gordon et al. |
| 2017/0123428 A1 | 5/2017 | Levinson et al. |
| 2017/0129487 A1 | 5/2017 | Wulf |
| 2017/0137023 A1* | 5/2017 | Anderson ............. B60W 30/02 |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |
| 2017/0248949 A1* | 8/2017 | Moran ................. G05D 1/0055 |
| 2017/0300855 A1 | 10/2017 | Lund |
| 2018/0032071 A1 | 2/2018 | Wieneke |
| 2018/0072323 A1 | 3/2018 | Gordon |
| 2018/0075309 A1* | 3/2018 | Sathyanarayana ... G05D 1/0088 |
| 2018/0086373 A1 | 3/2018 | Tamura |
| 2018/0093631 A1* | 4/2018 | Lee ................. B60R 21/01538 |
| 2018/0141453 A1 | 5/2018 | High |
| 2018/0154906 A1 | 6/2018 | Dudar |
| 2018/0203455 A1 | 7/2018 | Cronin |
| 2018/0265054 A1 | 9/2018 | Hofmann |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 A1 | 2/1994 |
| WO | 2014058263 | 4/2014 |
| WO | 2014066721 | 5/2014 |
| WO | 2014147361 | 9/2014 |
| WO | 2014148975 | 9/2014 |
| WO | 2014148976 | 9/2014 |
| WO | 2015024616 | 2/2015 |
| WO | 2015056105 | 4/2015 |

OTHER PUBLICATIONS

O'Callaghan, Jonathan. "Should a Self-Driving Car Kill Its Passengers in a 'Greater Good' Scenario?" iflscience.com, Oct. 26, 2015. Web. Sep. 22, 2016. <http://www.iflscience.com/technology/should-self-driving-car-be-programmed-kill-its-passengers-greater-good-scenario/>.

Lin, Patrick. "The Robot Car of Tomorrow May Just Be Programmed to Hit You". Conde Nast, wired.com, May 6, 2014. Web. Sep. 22, 2016. <https://www.wired.com/2014/05/the-robot-car-of-tomorrow-might-just-be-programmed-to-hit-you/>.

P. Mell et al., "The NIST Definition of Cloud Computing", National Institute of Standards and Technology, Information Technology Laboratory, Sep. 2011, pp. 1-7.

wikipedia.com, "Crumple Zone". Wikimedia Foundation, Inc., Jan. 1, 2017. Web Jan. 4, 2017.<https://en.wikipedia.org/wiki/Crumple_zone>.

Anonymous, 'System and Method to Target Advertisements for the Right Focus Group' ip.com, No. 000218285, May 31, 2012, pp. 1-2.

Anonymous, "Car Built-In Mechanism to Enforce Mandatory Self-Driving Mode", ip.com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technology's Benefits, Potential Risks, and Solutions", The Energy Collective, theenergycollective.com, Aug. 19, 2014, pp. 1-7.

Chen S, et al., "A Crash Risk Assessment Model for ROAS Curves". Inproceedings 20th International Technical Conference on the Enhanced Saftey of Vehicles., 2007. Lyon, France.

J. Wei et al., "Towards a Viable Autonomous Driving Research Platform", IEEE, Intelligent Vehicles Symposium (IV), 2013, pp. 1-8.

Anonymous, "Diagnostics Mechanism for Self-Driving Cars to Validate Self-Driving Capabilities", ip.com, June 6, 2014, pp. 1-5. ip.com.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.Mar. 1-4, 2012, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

C. Berger et al., "Cots-Architecture With a Real-Time OS for a Self-Driving Miniature Vehicle", SAFECOMP 2013—Workshop

(56) References Cited

OTHER PUBLICATIONS

ASCOMS of the 32nd International Conference on Computer Safety, Reliability and Security, Sep. 2013, Toulouse, France, pp. 1-13.
Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.
Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/Google-Files-Patent-For-Second-Gen-Autonomous-Vehicle-Without-A-Steering-Wheel-Brake-Pedal-More.html>.
R. Vaidyanathan et al., "A Reflexive Vehicle Control Architecture Based on a Neural Model of the Cockroach Escape Response", Institution of Mechanical Engineers. Journal of Systems and Control Engineering, 2011, vol. 226, No. 5, pp. 699-718.

\* cited by examiner

SELF-DRIVING VEHICLE COLLISION MANAGEMENT SYSTEM

BACKGROUND

The present disclosure relates to the field of vehicles, and specifically to the field of self-driving vehicles. Still more specifically, the present disclosure relates to the field of managing self-driving vehicles during collision events.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In an embodiment of the present invention, a method and/or computer program product generates and implements a real-time amelioration action for ameliorating an imminent collision between a self-driving vehicle (SDV) and an object. One or more processors detect that an imminent collision by a self-driving vehicle (SDV) is imminent with a first confidence, and determine whether the SDV has an occupant of a particular occupant type with a second confidence. One or more processors identify an object with which the imminent collision by the SDV is imminent with a third confidence, and then generate and implement, based on the first confidence, the second confidence, the third confidence, and the occupant type, a real-time amelioration action for ameliorating the imminent collision between the SDV and the object.

In an embodiment of the present invention, a system includes an on-board computer with one or more processors, one or more computer readable memories, one or more computer readable storage mediums, and program instructions stored on at least one of the one or more storage mediums for execution by at least one of the one or more processors via at least one of the one or more memories. The stored program instructions include: program instructions configured to detect that an imminent collision by a self-driving vehicle (SDV) is imminent with a first confidence; program instructions configured to determine whether the SDV has an occupant of a particular occupant type with a second confidence; program instructions configured to identify an object with which the imminent collision by the SDV is imminent with a third confidence; and program instructions configured to generate and implement, based on the first confidence, the second confidence, the third confidence, and the occupant type, a real-time amelioration action for ameliorating the imminent collision between the SDV and the object.

DETAILED DESCRIPTION

Figure 1:
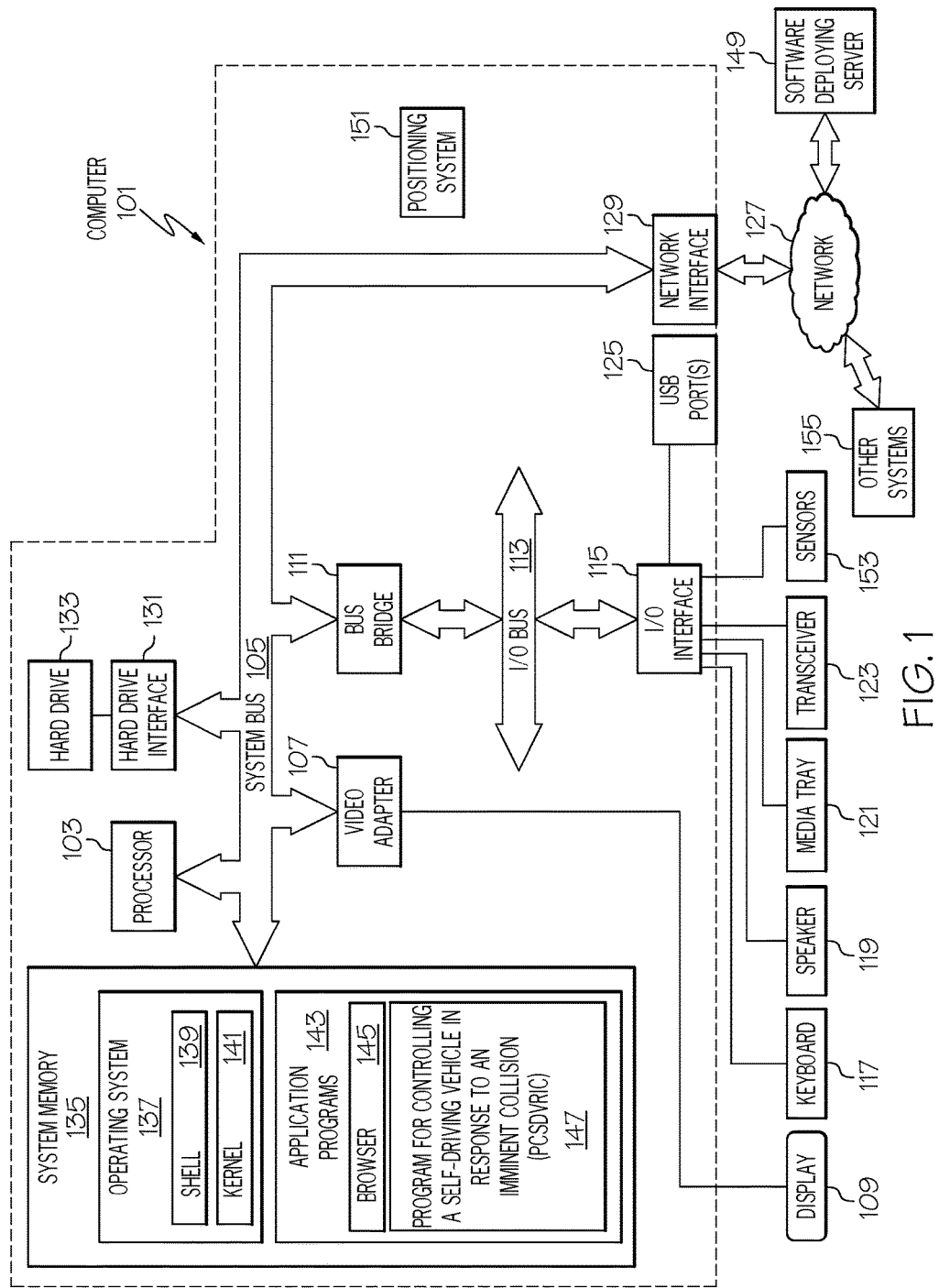
FIG. 1 depicts an exemplary system in accordance with one or more embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 155 shown in FIG. 1, and/or monitoring system 201 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
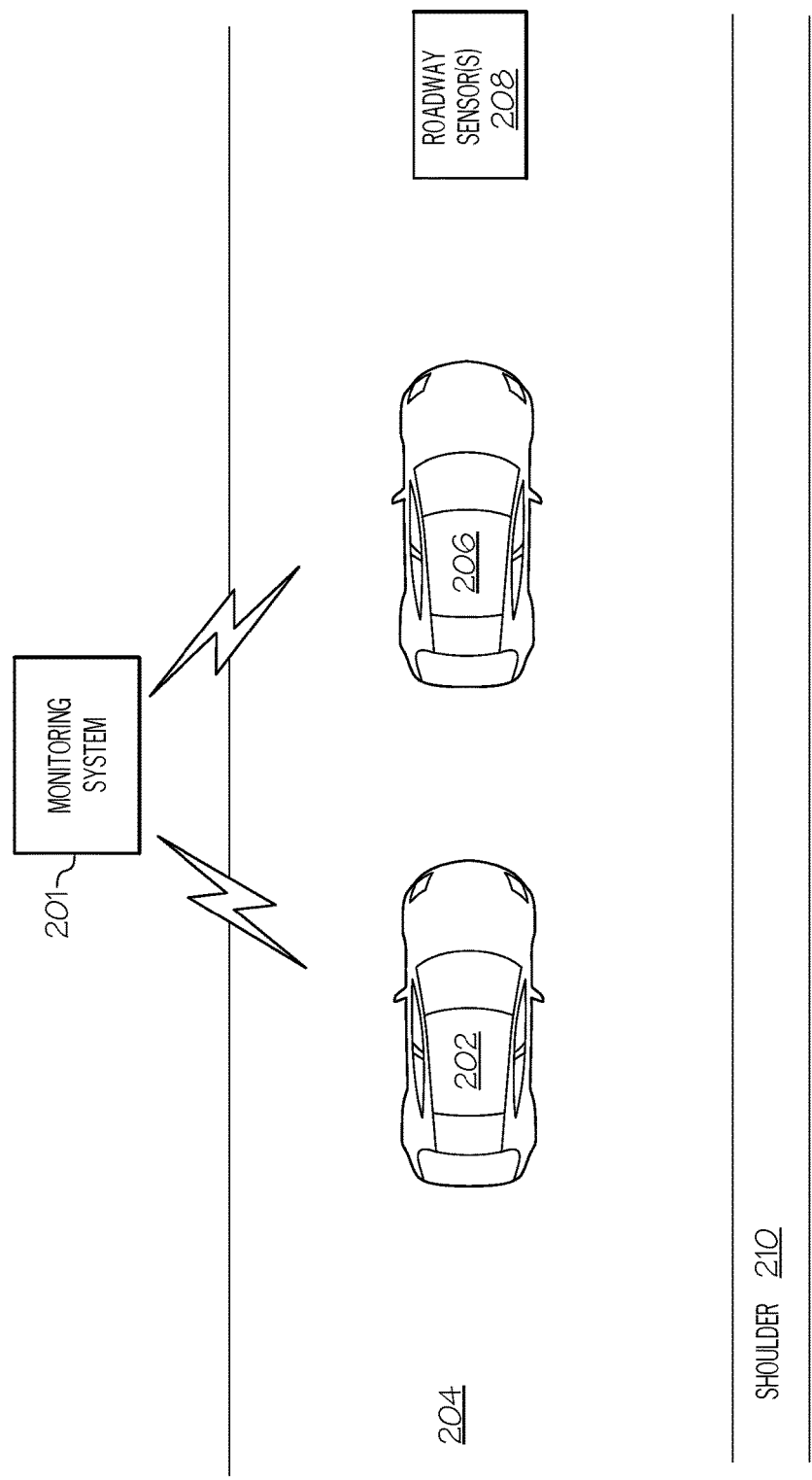
FIG. 2 illustrates an exemplary self-driving vehicle (SDV) performing a maneuver responsive to an imminent collision in accordance with one or more embodiments of the present invention.

As depicted, computer 101 is able to communicate with a software deploying server 149 and/or other systems 155 (e.g., establishing communication between monitoring system 201 and SDV 202 shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file.

Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Controlling a Self-Driving Vehicle in Response to an Imminent Collision (PCSDVRIC) 147. PCSDVRIC 147 includes code for implementing the processes described below, including those described in FIGS. 2-6. In one embodiment, computer 101 is able to download PCSDVRIC 147 from software deploying server 149, including in an on-demand basis, wherein the code in PCSDVRIC 147 is not downloaded until needed for execution. In one embodiment of the present invention, software deploying server 149 performs all of the functions associated with the present invention (including execution of PCSDVRIC 147), thus freeing computer 101 from having to use its own internal computing resources to execute PCSDVRIC 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101 and/or the state of occupants of a self-driving vehicle (SDV). More specifically, when detecting the environment of the SDV, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, microphones (e.g., microphone 331 shown in FIG. 3), light sensors such as light sensor 329 shown in FIG. 3 for detecting how dark a roadway is, chemical sensors such as chemical sensor 327 shown in FIG. 3 for detecting chemical spills on a roadway, moisture detectors, etc. that detect ambient weather conditions, traffic conditions (as detected by the cameras, microphones, etc.), and other environmental conditions of a roadway upon which the SDV is traveling. When detecting the state of occupants of the SDV, sensors 153 may be any type of device capable of detecting the biometric state of the occupants of the SDV, including but not limited to cameras (that detect facial and body movements), microphones such as microphone 331 shown in FIG. 3 that detect vocalizations, body sounds, etc. emanating from the occupants, biometric sensors (e.g., electrocardiograph (ECG/EKG) monitors, blood pressure monitors, etc.), etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As used herein, the term "occupant" is used to describe both animate occupants (i.e., passengers such as humans, pets, etc.) as well as inanimate occupants (i.e., cargo).

With reference now to FIG. 2, an exemplary self-driving vehicle (SDV) 202 is depicted traveling along a roadway 204. Assume now that SDV 202 determines (e.g., using the SDV on-board computer 301 described below in FIG. 3) that a collision between SDV 202 and vehicle 206 (which may be another SDV or a non-SDV vehicle) and/or a human pedestrian and/or an animal (domestic or wild) and/or a fixed object (e.g., a guardrail, a tree, etc.) is imminent. This imminent collision may be determined by the SDV on-board computer 301 within SDV 202 and/or by a processor within a monitoring system 201 (analogous in architecture to computer 101 shown in FIG. 1).

The present invention adjusts how SDV 202 will react to the imminent collision according to 1) what types of occupants (if any) are riding in SDV 202, and/or 2) the nature of the object that is about to be hit by SDV 202. For example, if there are human passengers within SDV 202, then the SDV on-board computer 301 (and/or the monitoring system 201) will put their lives and safety above physical damage that may occur to the object about to be hit, as described in detail herein. Alternatively, if there are no passengers within SDV 202 (i.e., SDV 202 is an SDV cargo vehicle with no passengers), then SDV 202 can be violently stopped (in order to avoid a collision) with no harm to any person.

As described herein, the type of ameliorative action taken by SDV 202 may be influenced by signals from roadway sensor(s) 208 of a problem on roadway 204. For example, roadway sensor(s) 208 may detect heavy traffic, ice on the road, windy conditions, a loose object on the roadway, etc. As such, SDV 202 may take ameliorative steps that take these conditions into account.

Figure 3:
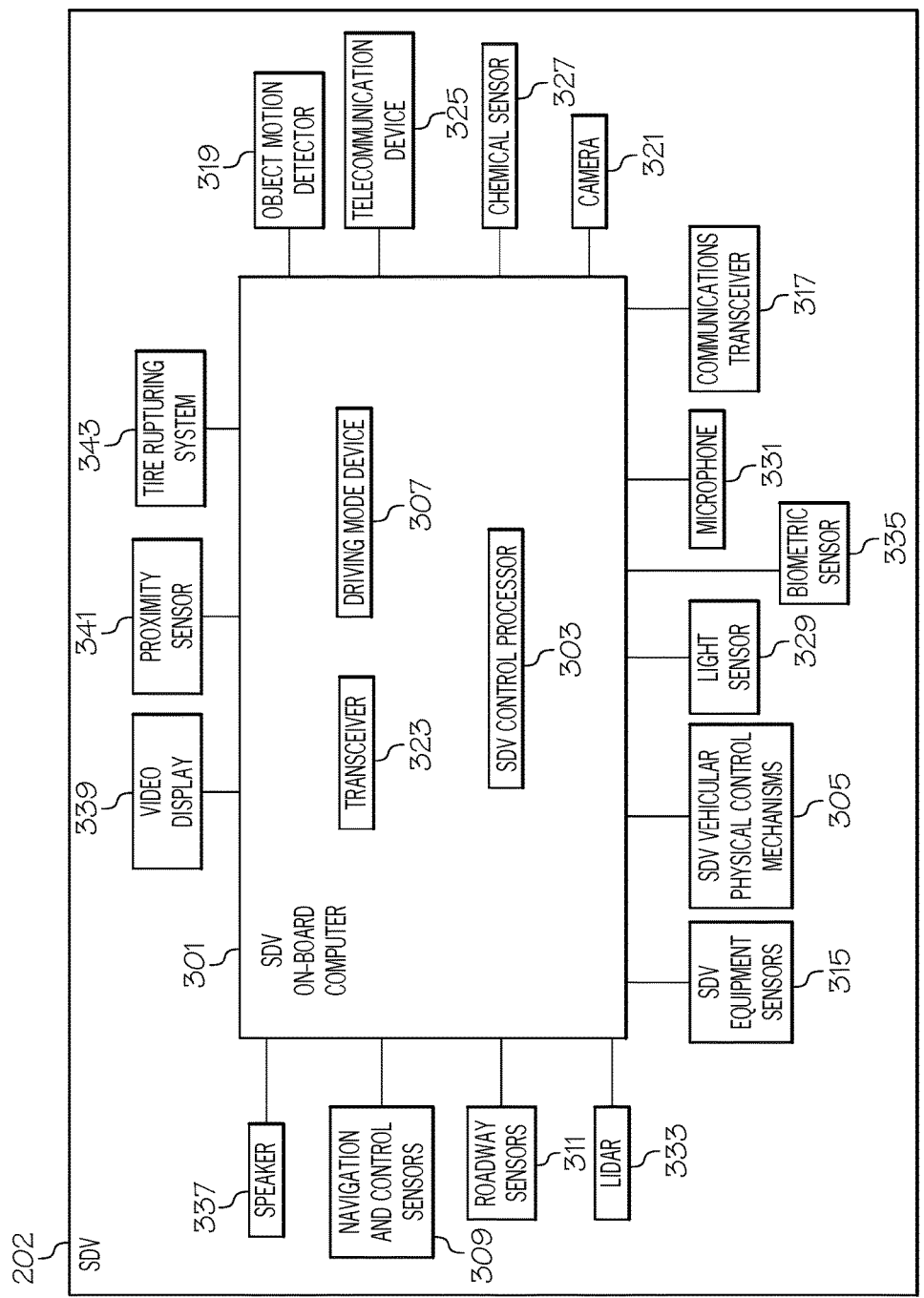
FIG. 3 depicts additional detail of the SDV illustrated in FIG. 2.

With reference now to FIG. 3, additional details of one or more embodiments of the SDV 202 are presented.

As shown in FIG. 3, SDV 202 has an SDV on-board computer 301 that controls operations of the SDV 202. According to directives from a driving mode device 307, the SDV 202 can be selectively operated in manual mode or autonomous mode. In a preferred embodiment, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (e.g., LIDAR 333 shown in FIG. 3) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 204 is using light sensors.

Similarly, a dedicated camera 321 can be trained on roadway 204, in order to provide photographic images of conditions on the roadway 204 upon which the SDV 202 is traveling.

Similarly, a dedicated object motion detector 319 (e.g., a radar transceiver capable of detecting Doppler shifts indicative of the speed and direction of movement of other vehicles, animals, persons, etc. on the roadway 204) can be trained on the roadway 204 upon which the SDV 202 is traveling.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Thus, in one or more embodiments of the present invention, if the SDV performs an ameliorative maneuver (e.g., pulls off to the shoulder 210 of roadway 204, collides with an object with the crumple zone 402a of the SDV 202, etc.), the SDV will warns the occupants before pulling off to the shoulder 210, such that this anomalous maneuver will not surprise the occupants of the SDV (particularly due to equipment malfunctions on the SDV and/or roadway conditions).

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301.

In one or more embodiments of the present invention, also within SDV 202 is a speaker 337, which is able to broadcast aural warnings (e.g., a buzzer, alarm, or computer-generated voice) that apprise the occupants of the SDV 202 and/or other persons/vehicles of an upcoming ameliorative maneuver SDV 202 will be performing.

In one or more embodiments of the present invention, also within SDV 202 is a video display 339, which is able to display visual warnings (e.g., a flashing light, a text message, etc.) that apprise the occupants of the SDV 202 and/or other persons/vehicles of an upcoming ameliorative maneuver SDV 202 will be performing.

In one or more embodiments of the present invention, also within SDV 202 is a proximity sensor 341, which uses motion detectors, radar (using Doppler shifting logic), etc. that detect an object (e.g., a vehicle in a next lane) near SDV 202.

In one or more embodiments of the present invention, also within SDV 202 is a tire rupturing system 343, which is capable of causing one or more tires on SDV 202 to blow out. For example, tire rupturing system 343 may be an explosive device (e.g., compressed air canister) that, when activated by SDV on-board computer 301, will cause a tire to blow out, resulting in SDV 202 coming to an abrupt slow-down.

Self-driving vehicles (SDVs) are likely to be ubiquitous on public roadways at some point in time. Despite the expected superiority of SDVs over human drivers (due to the vastly quicker response times of computers that control SDVs over human drivers that control non-SDV vehicles), some SDV collisions may be unavoidable.

In accordance with one or more embodiments of the present invention, if an SDV has no occupant, then the SDV may take certain actions that may lead to its own demise so as to avoid harm to an object about to be struck (e.g. another car with passengers, a pedestrian, etc.). That is, if the SDV "knows" that it has no human passengers, and the SDV is about to hit another vehicle that may or may not contain human passengers, then the SDV will sacrifice its own well being (e.g., by swerving off a cliff) rather than hitting the other vehicle.

Thus and as described herein, the present invention utilizes a self-driving vehicle (SDV), a means for determining that a crash (collision) is imminent with confidence C1, a means for determining if the SDV has a passenger (occupant) of type P with confidence C2, and a means for determining aspects of the object to be collided with, with confidence C3. Based, on C1, C2, C3, and P, the system plans a real-time amelioration action. For example, if the SDV has no occupant, it may take certain actions that may cause more damage to itself in a collision (such as breaking apart more easily) than it would if it had an occupant.

The determining of a crash with confidence C1 may be based on analytics of sensor data (e.g., a captured visual image of an object in a travel path, LIDAR information about a distance between the SDV 202 and another vehicle/object, etc.). That is, the determination that SDV 202 is about to be involved in a collision with another object is at a confidence level C1. For example, C1 may be "there is a 90% probability that SDV 202 is about to hit an object if no ameliorative steps are taken to avoid that object".

Passenger type P may be any of human, pet, package (e.g. for delivery), or no passenger at all. Confidence C2 is the confidence level (e.g., probability) that the system has accurately identified what type of occupant (animate or inanimate) is currently within SDV 202.

Confidence C3 is the confidence level (e.g., probability) that the system has accurately identified what type of object is about to be hit by SDV 202 (i.e., is the object a manually controlled vehicle, an SDV, a pedestrian, an animal, etc.), and/or what types and quantity of occupants are within the other vehicle (assuming that the object that the SDV 202 is about to hit is another vehicle).

As described herein, the object that SDV 202 is about to collide with may be any of: another SDV (with or without passenger), another vehicle that is not an SDV, a person, an animal, a tree, a rock, a guard rail, a deer, school bus, bridge, etc.

In addition, the object may be behind SDV 202. For example, when an SDV senses it is about to become disabled on a road with fast moving traffic close behind, and when a shoulder is narrow or unavailable, the SDV without passengers may determine that driving over an embankment poses less risk to human drivers behind it than becoming disabled in the roadway.

In various embodiments of the present invention, the amelioration action may be one or more of: allowing the SDV 202 to break apart (so as to lessen the impact on the object to be collided with); performing a certain kind of very aggressive braking or steering maneuver; allowing the SDV 202 to self-destruct (e.g., with a tree on the side of the road); blowing out the SDV tires (in order to quickly bring the SDV 202 to a stop); not triggering the air bags within the SDV 202 (if no occupant is in the car); allowing the SDV 202 to "crumple" into the occupant area if there is no occupant; etc.

Figure 4:
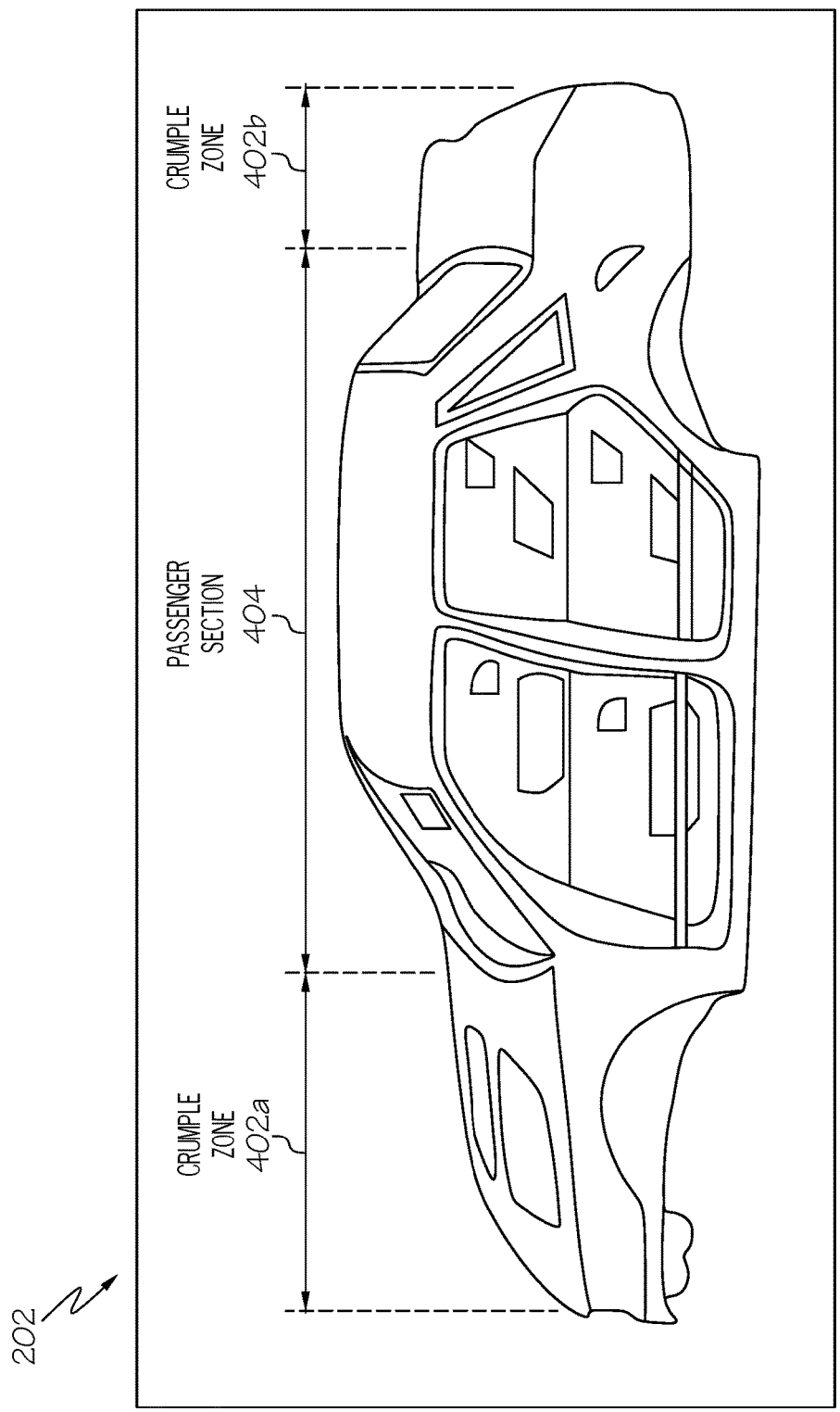
FIG. 4 illustrates various crumple zones on an SDV as utilized in accordance with one or more embodiments of the present invention.

With reference now to FIG. 4, crumple zones 402a-404b on SDV 202 are designed to absorb the energy from the impact during a traffic collision by controlled deformation. That is, SDV 202 is designed such that crumple zones 402a-404b will absorb the energy of a collision, thereby protecting the passengers riding in the passenger section 404. Crumple zones 402a-404b may use aluminum, composite/carbon fiber honeycomb, or energy absorbing foam to form an impact attenuator that dissipates crash energy. Thus, if the SDV on-board computer 301 within SDV 202 knows the energy absorbing capabilities of crumple zone 402a and/or crumple zone 402b, and that there are passengers riding within passenger section 404, then the SDV on-board computer 301 within SDV 202 will maneuver SDV 202 just before a collision such that the collision energy is absorbed by crumple zone 402a and/or crumple zone 402b, thereby protecting the passengers within passenger section 404.

The object characterization (of the object to be collided with) may include an assessment of object's weight (since the results of collision may depend on the relative weight of the SDV 202 and the object being struck).

If the SDV 202 has no passenger, then SDV 202 need not take passenger "whiplash" into account when taking actions, nor the excessive "G" forces occurring with very aggressive braking, swerving, etc.

The present invention is able to handle many collision scenarios. For example, suppose that SDV 202 "knows" it will crash (e.g., based on sensor readings from sensors on SDV 202) head-on into another vehicle or a fixed object (e.g., a large appliance that just fell off the back of a truck in front of the SDV 202). If SDV 202 has a human passenger, it might swerve to hit another vehicle moving in the same direction, thus relying on the crumple zones of both vehicles to protect their passengers (including the passengers within SDV 202). However, if SDV 202 has no passenger, then it would be willing sacrifice itself by breaking apart, slamming into a concrete wall, driving over a cliff, etc., thereby protecting passengers in other vehicles (about to be hit by SDV 202) from harm. In addition, pile-ups on highways remain a very serious danger to drivers, sometimes involving more than 100 cars. When an SDV such as SDV 202 is involved in a pileup and has no passengers, the present invention enables SDV 202 to change vehicle parameters in order to absorb more of the pileup as the pileup grows in size, even to the point of SDV 202 allowing itself to be pulverized (in order to provide an additional barrier/cushion to other vehicles).

In accordance with one or more embodiments of the present invention, an electronic system (e.g., SDV on-board computer 301) in SDV 202 includes crash prediction modules and sensor systems each arranged to sense or predict an imminent crash involving SDV 202. An occupant-sensing system may detect the presence of an occupant. The crash prediction system(s) and the occupant system(s) may be connected to a bus and supplied with power by the bus and communication through the bus. Each occupant device and crash-prediction device may be actuated in the event of a predicted crash involving the vehicle as sensed by a sensor system. The system for predicting and evading crashes of the SDV may include an imaging system of the surroundings.

In one or more embodiments of the present invention, SDV 202 has an array of sensors, which are employed to detect an imminent collision. For example, consider SDV 202 as depicted in FIG. 5.

A LIDAR system 533 (analogous to LIDAR 333 depicted in FIG. 3) uses a rotating roof top camera, which acts a laser range finder. With its array of multiple (e.g., 64 or more) laser beams, this camera creates 3-D images of objects, which helps the car register/see hazards along the way. This device calculates how far an object is from the moving vehicle based on the time it takes for the laser beams to hit the object and come back. These high intensity lasers can calculate distance and create images for objects in a 200 meter range.

Distance sensors 519 (analogous to object motion detector 319 shown in FIG. 3) may use radar transceivers mounted on the front and rear bumpers of SDV 202 to enable SDV 202 to be aware of vehicles in front of it and behind it. As known to those skilled in the art of electronics, radar is an object-detection system that uses radio waves to determine the range, angle, or velocity of objects.

Figure 5:
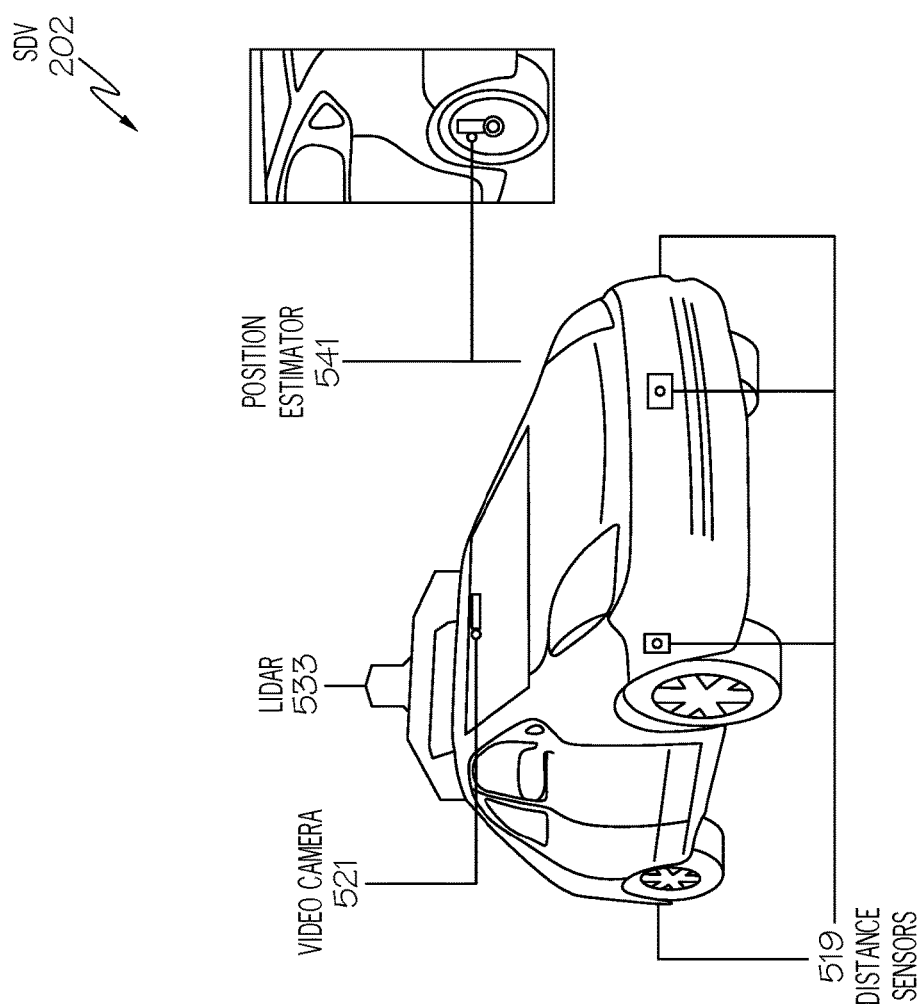
FIG. 5 depicts a placement of exemplary sensors on an SDV as utilized in accordance with one or more embodiments of the present invention.

As depicted in FIG. 5, a video camera 521 (analogous to camera 321 shown in FIG. 3) may be mounted on the windshield of SDV 202. This camera, with the help of image processing and artificial intelligence found within on-board SDV computer 301, will interpret common road behavior and motorist signs. For example, if a cyclist gestures that he intends to make a turn, the driverless car interprets it correctly and slows down to allow the cyclist to turn. Predetermined shape and motion descriptors are programmed into the system to help the SDV 202 make intelligent decisions.

Position estimator 541 (analogous to proximity sensor 341 shown in FIG. 3) may be configured as an ultrasonic sensor, which uses sound propagation to detect objects. Position estimator 541 can also be used as a geophysical location device, when mounted on one of the rear wheels of SDV 202, thus enabling position estimator 541 to calculate the number of rotations of the wheel in order to find the exact location of the SDV 202.

In one or more embodiments of the present invention, crash prediction is achieved through the user of a neural network (e.g., part of SDV on-board computer 301) which has been previously trained with training data to predict the possibility of crashing, where the training data represents ever-changing views previously picked-up by an image picking-up means during the driving of vehicles.

The SDV 202 may include a vehicle travel management system that monitors the location of vehicles in a travel lane, as well as other objects in the vicinity of the SDV 202. This information is then used by the SDV on-board computer to generate an amelioration action upon determining that SDV 202 is about to be involved in a collision.

In one or more embodiments, the present invention employs a pre-crash system with a controller coupled to object sensors, which have a vision system that includes image sensors to detect an impending impact (including side impacts). The image sensors provide a high frame rate to a video-processing chip, which in turn is coupled to a general purpose controller. The general-purpose controller may determine whether an object is an impending threat and controls the deployment of an airbag through an airbag controller or other counter-measure. If the SDV has no occupants, the airbag need not deploy, and the SDV may allow greater destruction to its body, since no human is in the SDV. The high frame rate used in the invention allows not only the determination of distance to the object but the velocity of the object as well as the acceleration of the object, and these findings are factored into the deployment decision.

In one or more embodiments, the vehicle navigation and crash assignment task is formulated as a constrained optimal control problem. A predictive, model-based controller iteratively plans an optimal or best-case vehicle trajectory through a constrained corridor. This best-case scenario is used to establish the minimum threat posed to the vehicle given its current state, current and past SDV inputs/performance, and environmental conditions. Based on this threat assessment, the level of controller intervention required to control collisions or instability is calculated. Various vehicle models, actuation modes, trajectory-planning objectives, etc. can be seamlessly integrated without changing the underlying controller structure. As an example, if the SDV is about to be hit from the rear (rear-ended), the SDV might release its brakes to reduce the damage to the vehicle behind it. Alternatively, the SDV that is about to be hit, could turn its wheels so that it doesn't collide into another vehicle when it is rear-ended.

In one or more embodiments of the present invention, an SDV safety system continuously evaluates data relating to the surroundings from a surroundings sensor system in terms of an imminent collision with an obstacle, and autonomous emergency braking is initiated in the event of an unavoidable collision. However, as described herein, this braking may be of a different nature if the SDV is unoccupied, since there is no danger to a possible occupant in the SDV from the high "G" forces experienced in aggressive braking.

In one or more embodiments, the present invention makes use of a guidance system through on-board GPS and two-way communication hardware. The current position of the vehicle may be continuously monitored and correlated to the position of potential hazards along its path, so that corrective action can be taken by implementing appropriate, predetermined control strategies. In various embodiments, the SDV will take into account its own operating tolerances.

While determining the amelioration action to take to either reduce the likelihood of a collision or to take a collision path that would reduce the likelihood of injuring a human, the SDV will also analyze the potential secondary impacts of its set of possible actions. For example, if a potential amelioration action is to break apart to avoid colliding with an object in front of it, the SDV will also determine whether breaking apart would potentially cause another collision with objects, vehicles, people or animals in the vicinity (potentially in front, on the sides or behind it). The SDV will then choose the optimal amelioration action with both the consideration of the potential initial collision against the potential impacts from selection of a specific action.

The SDV may also take into account financial considerations in the determination of the action. For example, the SDV may determine that there is an object obstructing the road (e.g., a tree branch) and that a collision could be entirely avoided if the SDV were to break apart. However, such breaking apart would cause a significant financial loss (the value of the SDV). An alternate option would be to allow the collision to occur, thus incurring a much lower financial loss (limited to the damaged areas of the SDV and required repairs) and/or the inanimate property it would collide with. The financial value assessment and loss determination would only be used to weight the actions in cases where a financial value can be definitively identified and not in cases where human or animal life is involved.

While the present invention has been described using scenarios in which the object about to be hit the by SDV are other vehicles, fixed objects, etc., the present invention is also useful when applied to scenarios in which the SDV is about to collide with a very heavy moving vehicle, such as a railroad train. The SDV may take differential actions based on whether the SDV has an occupant or is empty. That is, if the SDV has no passengers, and if swerving to miss a train endangers other persons, and the SDV is significantly lighter than the oncoming train, then the SDV may sacrifice itself by letting the train hit it, rather than maneuvering in a manner that endangers pedestrians, other small vehicles, etc.

In one or more embodiments, the present invention takes into account the passable width of a road, the width of available shoulder, as well as the threat posed by going beyond passable road (e.g., colliding with cars going in opposite direction, or falling off downhill lane of switchback road up steep hill) when generating an ameliorative action. The SDV may have knowledge of a road map and forecast traffic/weather, even if it cannot see 100% with its real-time sensors.

SDVs may have physical areas that are more hardened to withstand accidents than other areas on its physical body, such as if two or more SDVs decide to collide with each other to achieve optimal ethical outcome, they may align themselves to collide on their respective hardened areas in a best effort manner. If an SDV has decided to sacrifice itself, then it may decide not to collide on the hardened areas. Also, certain regions may have more shock-absorbing features than others, and this may be taken into account.

In one or more embodiments of the present invention, the SDV may immediately move the seating within the car in order to minimize injuries to the passenger(s). That is, the SDV on-board computer 301 may push back a front seat in the passenger compartment of the SDV just before the collision occurs, thereby giving the passengers more room between themselves and deploying air bags.

In one or more embodiments of the present invention, SDV 202 can also learn from other SDVs around the same geolocation and context (e.g. road conditions/weather) regarding what decision they have taken and the outcomes of those decisions a priori and apply such lessons when similar situations arise. That is, the SDV on-board computer 301 in SDV 202 can use a probabilistic function to define the best possible option based on the other SDVs and human inputs.

In one or more embodiments of the present invention, a human driver or passenger may be allowed to override the decision of the SDV 202 if time permits.

In an embodiment of the present invention in which SDV 202 is unoccupied, a full-size interior airbag may deploy if the SDV senses that it is about to be in an accident to minimize interior damage. Alternatively, the interior may fill with a fast expanding foam (to protect the interior of the SDV 202) and/or with fire-retarding agents and foams to inhibit explosions and fires. Such actions are not taken if the SDV 202 has people in it.

Figure 6:
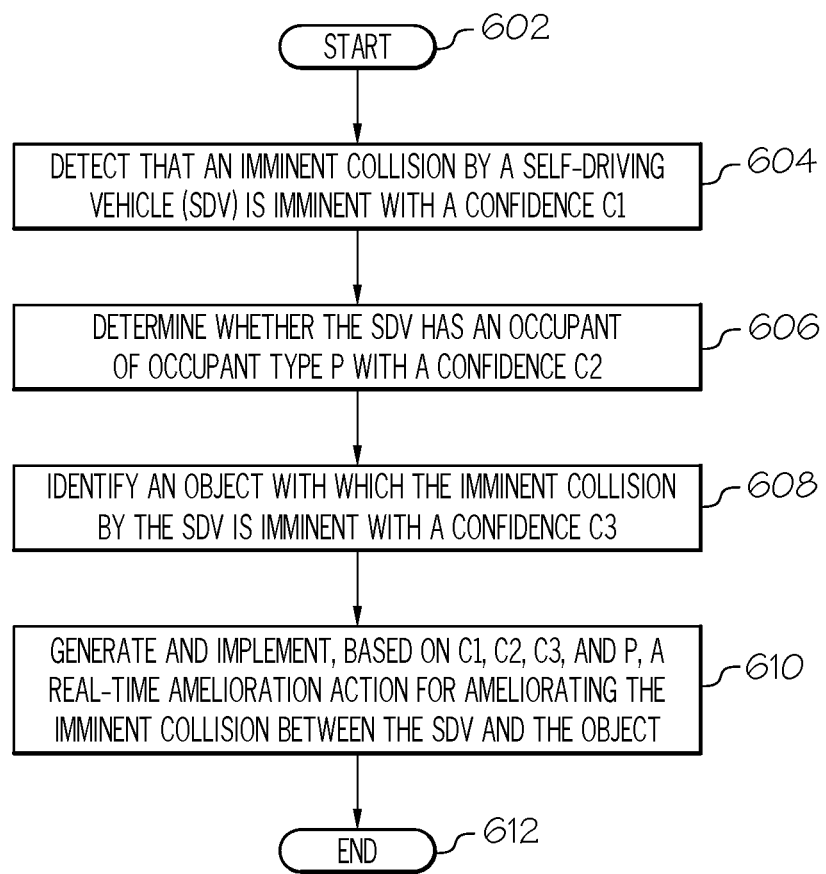
FIG. 6 is a high-level flow chart illustrating a process in accordance with one or more embodiments of the present invention.

With reference now to FIG. 6, a high-level flow chart illustrating a process performed by one or more processors and/or other hardware devices in accordance with one or more embodiments of the present invention is presented.

After initiator block 602, one or more processors (e.g., within SDV on-board computer 301 shown in FIG. 3) detect that an imminent collision by a self-driving vehicle (SDV) is imminent with a confidence C1, as described in block 604. For example, SDV on-board computer 301 within SDV 202 may determine that SDV 202 is about to collide with another vehicle, fixed object, pedestrian, etc., unless ameliorative steps are taken to alter the path of SDV 202. This determination has a confidence level C1, which is the probability (e.g., 95%) that the SDV on-board computer 301 has accurately made the prediction. This confidence level C1 may be based on past experiences with other SDV on-board computers 301 programmed in a similar manner (and/or under similar roadway conditions, traffic conditions, SDV configuration, etc.). That is, if other SDV on-board computers 301 have correctly predicted that the SDVs in which they are located are going to have an immediate collision 95% of the time, then confidence level C1 would be 95.

As described in block 606, one or more processors determine whether the SDV has an occupant of occupant type P with a confidence C2. This confidence level C2 may be based on past experiences with other SDV on-board computers 301 programmed in a similar manner and/or utilizing similar sensors within the cabin of SDV 202 (e.g., camera 321 aimed at the interior of the cabin of SDV 202). That is, if other SDV on-board computers 301 have correctly identified the occupant type P (i.e., where P=human) 99% of the time, then confidence level C2 would be 99.

As described in block 608, one or more processors identify an object with which the imminent collision by the SDV is imminent with a confidence C3. For example, the processors may identify vehicle 206 in front of SDV 202 shown in FIG. 2 with a 90% confidence level. This confidence level C3 may be based on past experiences with the SDV on-board computer 301 within SDV 202 and/or other SDV on-board computers 301 on other SDVs that have been programmed in a similar manner (and/or under similar roadway conditions, traffic conditions, SDV configuration, etc.). That is, if these SDV on-board computers 301 have correctly identified objects that are about to be hit by the SDV in which they are located are going to have an immediate collision 90% of the time, then confidence level C3 may be 90.

Thus, confidence level C1 reflects how confident the system is that it has correctly predicted/detected an imminent collision. Confidence level C2 reflects how confident the system is that is has corrected determined what type of occupants (if any) are currently in the SDV. Confidence level C3 reflects how confident the system is that it has correctly identified the object about to be hit by the SDV. Confidence level C3 is based on 1) how confident the system is that it has detected the object about to be hit by the SDV, and/or 2) how confident the system is that it has identified what type of object (person, vehicle, animal, etc.) is about to be hit.

As described in block 610, one or more processors then generate and implement, based on C1, C2, C3, and P, a real-time amelioration action for ameliorating the imminent collision between the SDV and the object. That is, once values for C1, C2, C3 and P are entered into the SDV on-board computer 301, then SDV on-board computer 301 is able to tell the SDV 202 what ameliorative steps (braking, speeding up, swerving, crashing into another object, etc.) the SDV 202 is to take.

The flow chart ends at terminator block 612.

In a further embodiment of the present invention, one or more processors determine confidence C1 based on an analysis of sensor data received in real-time from one or more sensors on the SDV. That is, SDV on-board computer 301 is able to determine how confident it is that it has correctly identified the object and/or object type about to be hit by SDV 202 based on camera readings (e.g., from vehicle camera 521), LIDAR 533, microphone 331 (detecting the sound of the object about to be hit), etc.

In an embodiment of the present invention, the occupant type P describes animate passengers in the SDV. That is, the system (e.g., using biometric sensor 335 and/or camera 321 and/or microphone 331 trained on passengers in SDV 202) will provide sensor readings that are associated with animate passengers. For example, such sensors may detect a barking sound in the cabin on SDV 202, indicative of a dog inside the SDV 202. SDV on-board computer 301 will then adjust the real-time ameliorative action accordingly.

In an embodiment of the present invention, the occupant type describes inanimate passengers in the SDV. For example, if biometric sensor 335 and/or camera 321 and/or microphone 331 trained on an interior cabin of SDV 202 detect no life forms, then SDV on-board computer 301 will assume that SDV 202 is only hauling cargo, and will adjust the real-time ameliorative action accordingly. That is, if no human lives are in danger, the real-time ameliorative action will be more likely to result in dramatic braking, deliberately hitting a wall, etc., unless doing so would damage the cargo.

In an embodiment of the present invention, the occupant type describes a lack of any occupants in the SDV. For example, if camera 321 trained on an interior cabin of SDV 202 detects no life forms, no cargo, etc., then SDV on-board computer 301 will assume that SDV 202 is empty, and will adjust the real-time ameliorative action accordingly. That is, if there is no risk to either human passengers or cargo, the real-time ameliorative action will be more likely to result in drastic steps up to and including severely damaging the SDV 202 in order to avoid risking damage/injury to other entities.

In an embodiment of the present invention, the object to be imminently collided with by the SDV is another SDV that has a human passenger. As such, the SDV on-board computer 301 in SDV 202 will generate a real-time ameliorative action that poses the least risk to both passengers in SDV 202 (if any) as well as passengers in the other vehicle (e.g., vehicle 206 shown in FIG. 2) that is about to be hit.

In an embodiment of the present invention, the object to be imminently collided with by the SDV is another SDV that has no passenger. As such, the SDV on-board computer 301 in SDV 202 will generate a real-time ameliorative action that poses the least risk to passengers in SDV 202, while not being concerned about property damage to the other vehicle (e.g., vehicle 206 shown in FIG. 2) that is about to be hit.

In an embodiment of the present invention, the object to be imminently collided with by the SDV is a pedestrian. As such, the SDV on-board computer will generate a real-time ameliorative action that poses the least risk to the pedestrian, even if that poses an elevated risk of injury to passengers in SDV 202 and damage to SDV 202, since hitting the pedestrian would most likely cause grave bodily injury to the pedestrian.

In an embodiment of the present invention, the object to be imminently collided with by the SDV is a non-human animal. As such, the SDV on-board computer will generate a real-time ameliorative action that does not pose an undue risk to passengers in SDV 202, nearby pedestrians, nearby vehicles when avoiding the non-human animal (e.g., a deer).

In an embodiment of the present invention, the object to be imminently collided with by the SDV is a vehicle that is not an SDV. That is, assume that SDV 202 is about to hit vehicle 206 shown in FIG. 2. Assume now that all (or at least most) SDVs broadcast a signal indicating that 1) they are in autonomous mode, and 2) are able to coordinate movements with other SDVs. As such, if vehicle 206 is another SDV, then SDV 202 and vehicle 206 can coordinate their movements in order to avoid hitting one another. However, if vehicle 206 is not an SDV, then the SDV on-board computer 301 in SDV 202 assumes that the course of movement of vehicle 206 will not change quickly enough to avoid the collision, and thus, SDV 202 may have to take all ameliorative steps to minimize the effect of the collision (if not avoiding it entirely).

In an embodiment of the present invention, the object to be imminently collided with the SDV is an inanimate object located in a fixed position (e.g., a tree branch in the middle of the road). As such, the SDV on-board computer 301 knows that this object will not be moving, and generates an ameliorative action that takes this into account (including, if necessary and being the safest alternative, simply allowing SDV 202 to hit the fixed object).

In an embodiment of the present invention, the amelioration action is to strike the object in a manner that causes energy-absorbing areas on the SDV to absorb an impact of the SDV striking the object. For example, if SDV 202 realizes that it cannot avoid hitting an object, it at least will position itself such that the crumple zone 402a takes the main brunt of the collision, thereby protecting the passengers within the passenger section 404 of the SDV 202 shown in FIG. 4.

In an embodiment of the present invention, the amelioration action is to cause at least one tire on the SDV to burst. For example, assume that SDV 202 is unoccupied. Assume further that SDV 202 is equipped with a tire rupturing system (e.g., tire rupturing system 343 shown in FIG. 3). If SDV on-board computer 301 directs the tire rupturing system 343 to cause one or more tires on the SDV 202 to blow out (rupture), this will result in SDV 202 abruptly slowing down (due to the drag and resistance caused by the ruptured tires).

In an embodiment of the present invention, assume that the SDV is unoccupied. If so, then the amelioration action in this embodiment is to prevent any airbags within the SDV from deploying in response to the SDV colliding with the object. That is, deploying airbags may damage cargo within the SDV, or may simply provide no benefit since there are no passengers (while still incurring the cost of replacement of the deployed airbags). As such, the airbags will be disabled. Note that there still may be a pressure sensor on seats in the SDV. However, the camera will detect that this pressure comes from cargo, not passengers, and will then disable the airbags.

In an embodiment of the present invention, one or more processors determine a weight ratio between the SDV and the object, and then adjust the amelioration action according to the weight ratio between the SDV and the object. For example, assume that SDV 202 is passenger sedan (with passengers on board) that is about to be hit by a fast-moving train (e.g., a train that is going over 60 miles per hour). As such, SDV 202 will take any reasonable step, including hitting another vehicle, hitting a wall, etc., rather than being hit by the fast-moving train, which would certainly be fatal to the occupants of SDV 202.

In an embodiment of the present invention, one or more processors adjust the amelioration action based on roadway conditions for a roadway on which the SDV is traveling. For example, if chemical sensors 327 in FIG. 3 detect the presence of flammable liquids on roadway 204 shown in FIG. 2, then the SDV on-board computer 301 may devise an ameliorative action that avoids driving through the flammable liquids. Similarly, if SDV on-board computer 301 has been alerted of inclement weather on the roadway 204 and/or knows (e.g., from a loaded digital map within the SDV on-board computer 301) that roadway 204 is about to curve sharply within 100 feet, then SDV on-board computer 301 will tailor the ameliorative action in order to accommodate these conditions.

In an embodiment of the present invention, assume that SDV 202 is a first SDV. One or more processors receive executable instructions for implementing an amelioration action performed by a group of other SDVs that experienced an imminent collision that was similar to the imminent collision being experienced by the first SDV, and then execute the executable instructions for implementing the amelioration action performed by the group of other SDVs. That is, SDV 202 can use ameliorative actions that were taken by other SDVs. Such ameliorative actions can be stored within the SDV on-board computer 301 within SDV 202.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
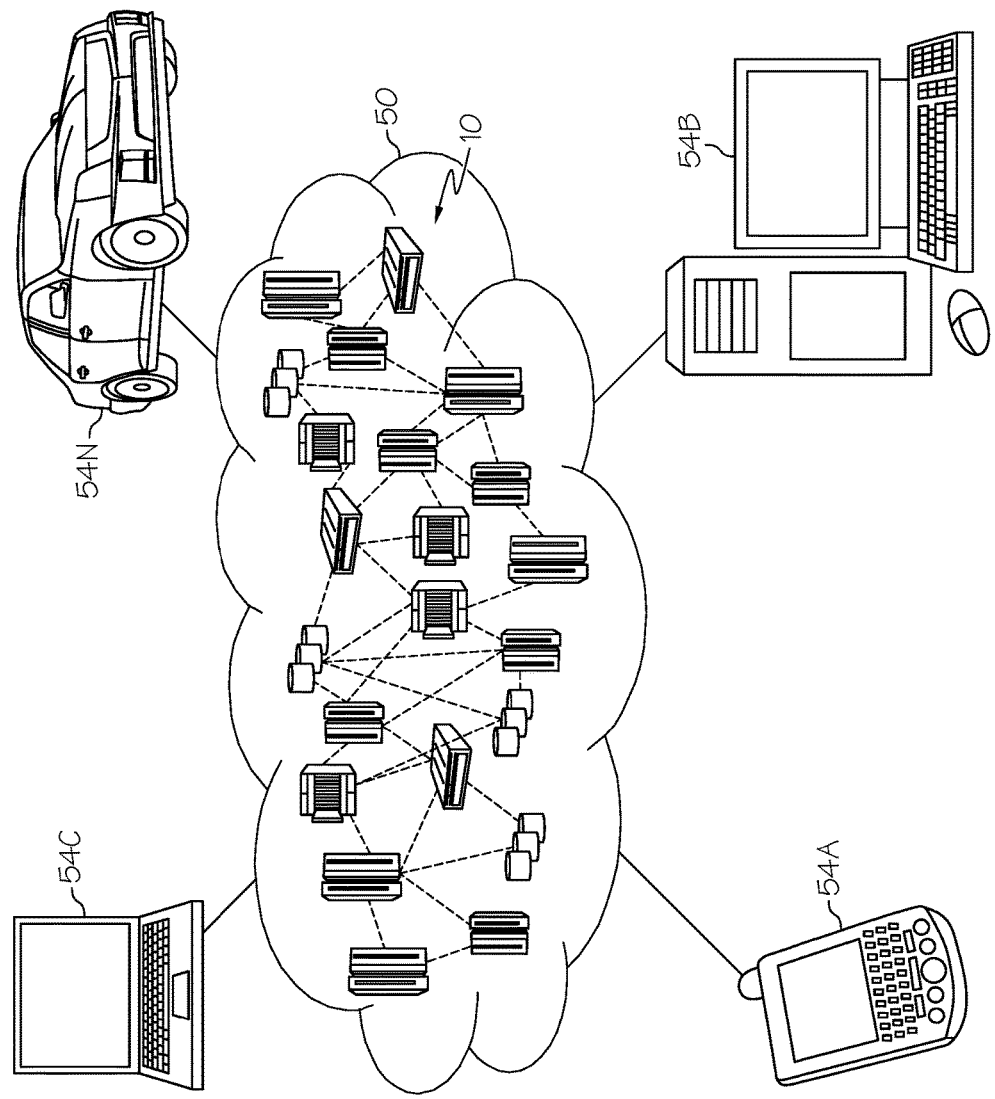
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
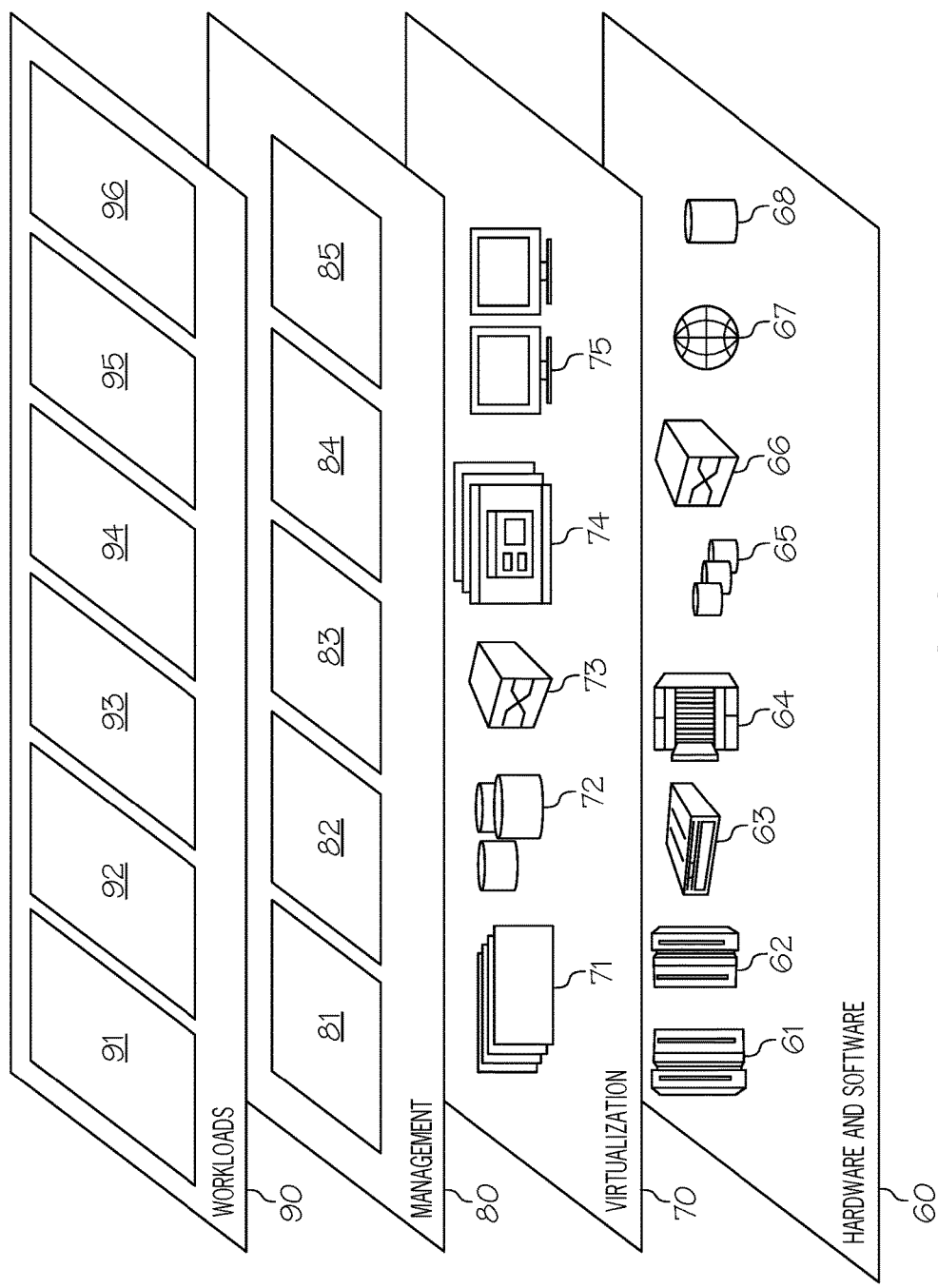
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SDV collision response processing 96 in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   detecting, by one or more processors, that an imminent collision by a self-driving vehicle (SDV) is imminent with a first confidence level, wherein the first confidence level is a first probability level that the SDV will hit an object if no ameliorative steps are taken by the SDV to avoid colliding with the object;
   determining, by one or more processors, whether the SDV has an occupant of a particular occupant type with a second confidence level, wherein the particular occupant type is a single occupant type from a group of occupant types consisting of an animate occupant type and an inanimate occupant type, wherein the second confidence level is a second probability level that an occupant detection system on the SDV has accurately identified what type of occupant is currently within the SDV;
   identifying, by one or more processors, an object with which the imminent collision by the SDV is imminent with a third confidence level, wherein the third confidence level is a third probability level that an object detection system on the SDV has accurately identified what type of object is about to be hit by the SDV if no ameliorative steps are taken by the SDV to avoid hitting the object; and
   generating and implementing, by one or more processors and based on the first confidence level, the second confidence level, the third confidence level, and the particular occupant type, a real-time amelioration action for ameliorating the imminent collision between the SDV and the object, wherein the real-time amelioration action comprises adjusting a movement of the SDV.

2. The computer-implemented method of claim 1, further comprising:
   determining, by one or more processors, the first confidence level based on an analysis of sensor data received in real-time from one or more sensors on the SDV.

3. The computer-implemented method of claim 1, wherein the object to be imminently collided with by the SDV is another SDV that has a human passenger.

4. The computer-implemented method of claim 1, wherein the object to be imminently collided with by the SDV is another SDV that has no passenger.

5. The computer-implemented method of claim 1, wherein the object to be imminently collided with by the SDV is a pedestrian.

6. The computer-implemented method of claim 1, wherein the object to be imminently collided with by the SDV is a vehicle that is not an SDV.

7. The computer-implemented method of claim 1, wherein the object to be imminently collided with by the SDV is an inanimate object located in a fixed position.

8. The computer-implemented method of claim 1, wherein the real-time amelioration action is to strike the object in a manner that causes energy-absorbing areas on the SDV to absorb an impact of the SDV striking the object.

9. The computer-implemented method of claim 1, wherein the SDV is unoccupied by an animate entity, and wherein the real-time amelioration action is to fill the interior of the SDV with a fast expanding foam to protect an interior of the SDV in response to the imminent collision between the SDV and the object.

10. The computer-implemented method of claim 1, wherein the SDV is unoccupied by an animate entity, and wherein the real-time amelioration action is to fill an interior of the SDV with a fire-retarding agent to inhibit an explosion and fire caused by the imminent collision between the SDV and the object.

11. The computer-implemented method of claim 1, wherein the SDV is a first SDV, wherein the object is a second SDV, and wherein the computer-implemented method further comprises:
   coordinating, by one or more processors, movement between the first SDV and the second SDV in order to prevent the first SDV and the second SDV from hitting each other.

12. The computer-implemented method of claim 1, wherein the SDV is a first SDV, and wherein the computer-implemented method further comprises:
   receiving, by one or processors, executable instructions for implementing an amelioration action performed by a group of other SDVs that experienced an imminent collision that was similar to the imminent collision being experienced by the first SDV; and
   executing, by one or more processors in the first SDV, the executable instructions for implementing the amelioration action performed by the group of other SDVs.

13. The computer-implemented method of claim 1, wherein the method is implemented as a cloud-based service.

14. A computer program product for generating and implementing a real-time amelioration action for ameliorating an imminent collision between a self-driving vehicle (SDV) and an object, the computer program product comprising a non-transitory computer readable storage medium having program instructions embodied therewith, the program instructions readable and executable by a processor to cause the processor to:
   detect that an imminent collision by a self-driving vehicle (SDV) is imminent with a first confidence level, wherein the first confidence level is a first probability level that the SDV will hit an object if no ameliorative steps are taken by the SDV to avoid colliding with the object;
   determine whether the SDV has an occupant of a particular occupant type with a second confidence level, wherein the particular occupant type is a single occupant type from a group of occupant types consisting of an animate occupant type and an inanimate occupant type, wherein the second confidence level is a second probability level that an occupant detection system on the SDV has accurately identified what type of occupant is currently within the SDV;
   identify an object with which the imminent collision by the SDV is imminent with a third confidence level, wherein the third confidence level is a third probability level that an object detection system on the SDV has accurately identified what type of object is about to be hit by the SDV if no ameliorative steps are taken by the SDV to avoid hitting the object; and
   generate and implement, based on the first confidence level, the second confidence level, the third confidence level, and the particular occupant type, a real-time amelioration action for ameliorating the imminent collision between the SDV and the object, wherein the real-time amelioration action comprises adjusting a movement of the SDV.

15. The computer program product of claim 14, wherein the program instructions are provided as a service in a cloud environment.

16. A system comprising:
   one or more processors;
   one or more computer readable memories operably coupled to the one or more processors; one or more computer readable storage mediums operably coupled to the one or more computer readable memories; and
   program instructions stored on at least one of the one or more computer readable storage mediums for execution by at least one of the one or more processors via at least one of the one or more computer readable memories, the program instructions comprising:
   program instructions configured to detect that an imminent collision by a self-driving vehicle (SDV) is imminent with a first confidence level, wherein the first confidence level is a first probability level that the SDV will hit an object if no ameliorative steps are taken by the SDV to avoid colliding with the object;
   program instructions configured to determine whether the SDV has an occupant of a particular occupant type with a second confidence level, wherein the particular occupant type is from a group of occupant types consisting of animate occupant types and inanimate occupant types, wherein the second confidence level is a second probability level that an occupant detection system on the SDV has accurately identified what type of occupant is currently within the SDV;
   program instructions configured to identify an object with which the imminent collision by the SDV is imminent with a third confidence level, wherein the third confidence level is a third probability level that an object detection system on the SDV has accurately identified what type of object is about to be hit by the SDV if no ameliorative steps are taken by the SDV to avoid hitting the object; and program instructions configured to generate and implement, based on the first confidence level, the second confidence level, the third confidence level, and the particular occupant type, a real-time amelioration action for ameliorating the imminent collision between the SDV and the object, wherein the real-time amelioration action comprises adjusting a movement of the SDV.

* * * * *